Oct. 11, 1955

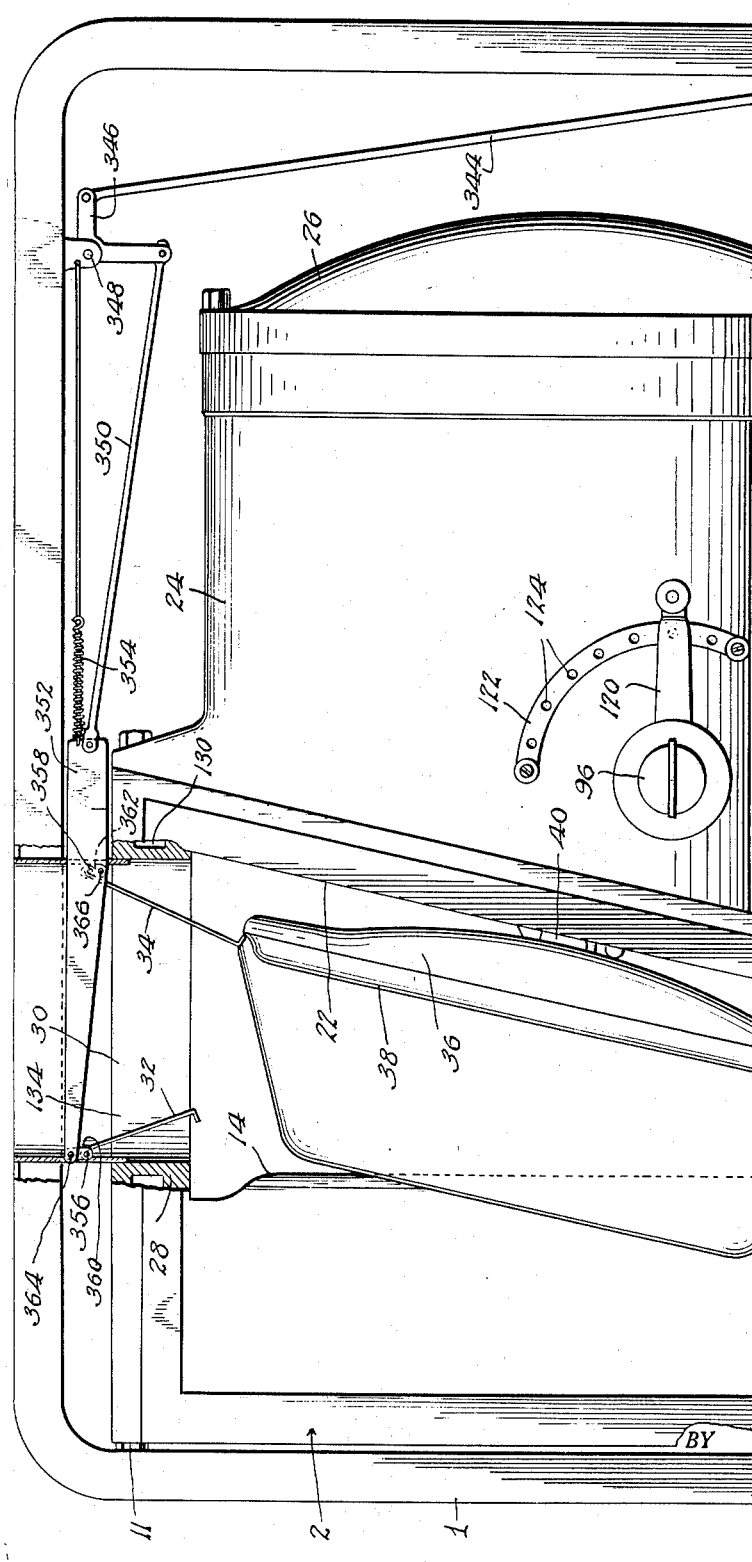

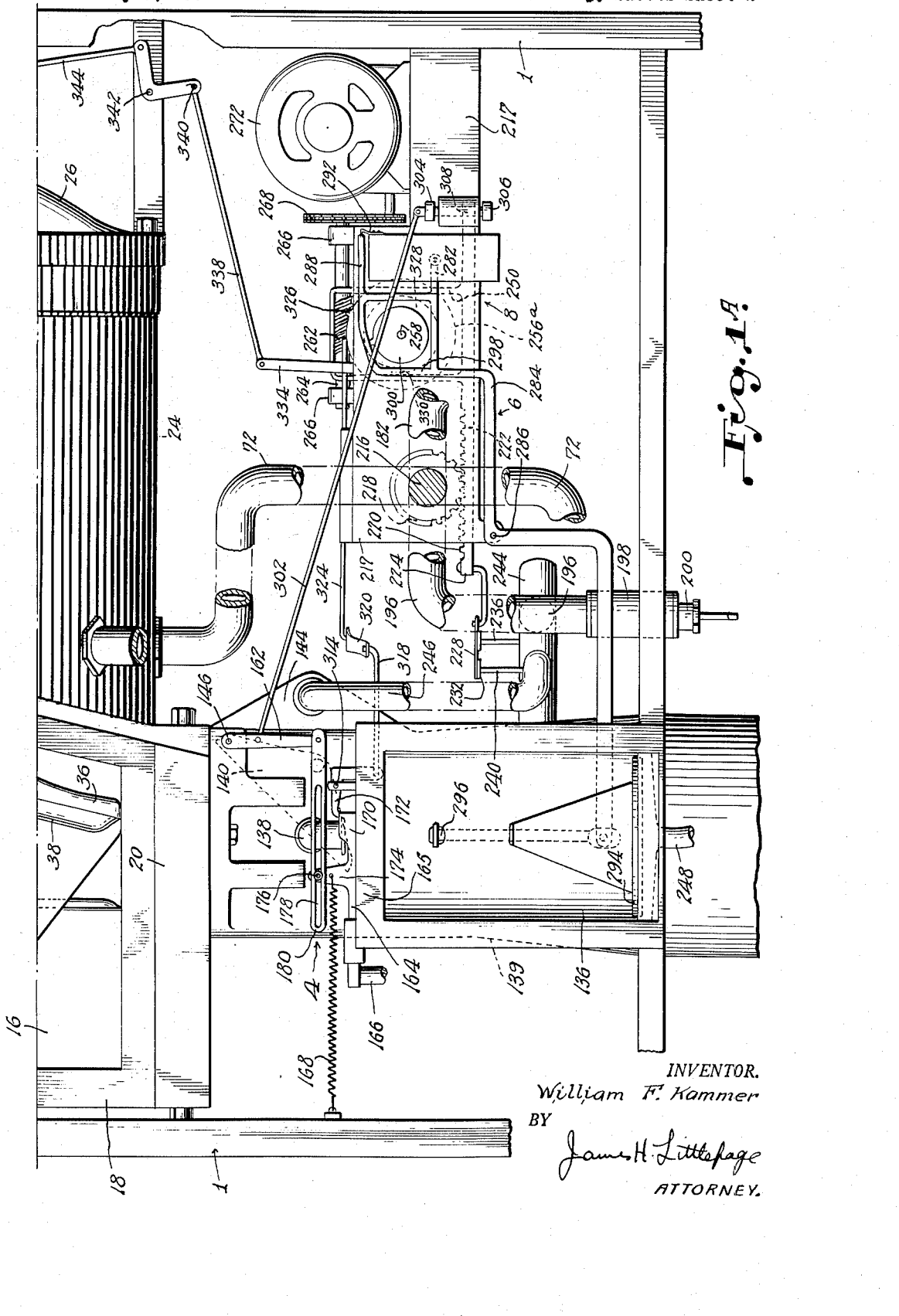

W. F. KAMMER 2,720,161

JUICE MACHINE

Filed July 9, 1951

INVENTOR.
William F. Kammer
BY
James H. Littlepage
ATTORNEY.

Oct. 11, 1955 W. F. KAMMER 2,720,161
JUICE MACHINE
Filed July 9, 1951 13 Sheets-Sheet 4
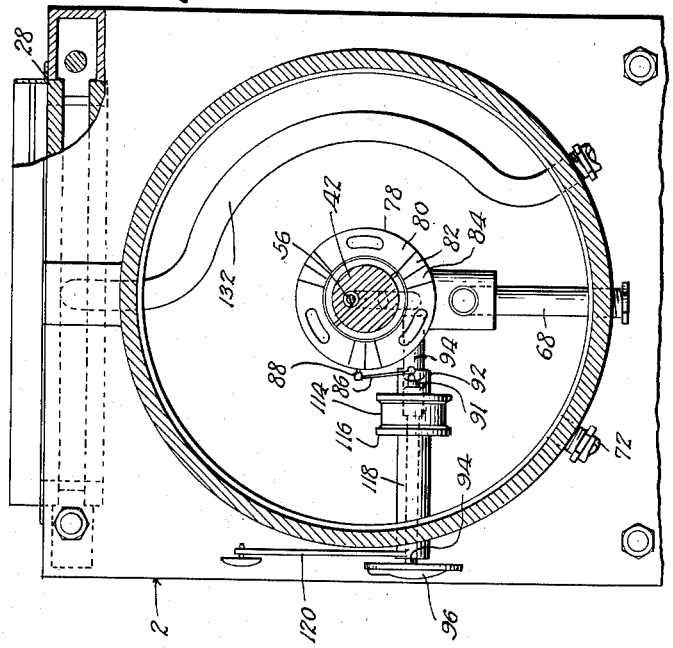
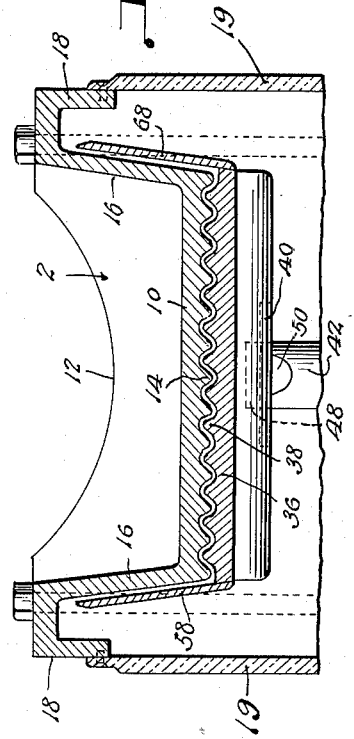
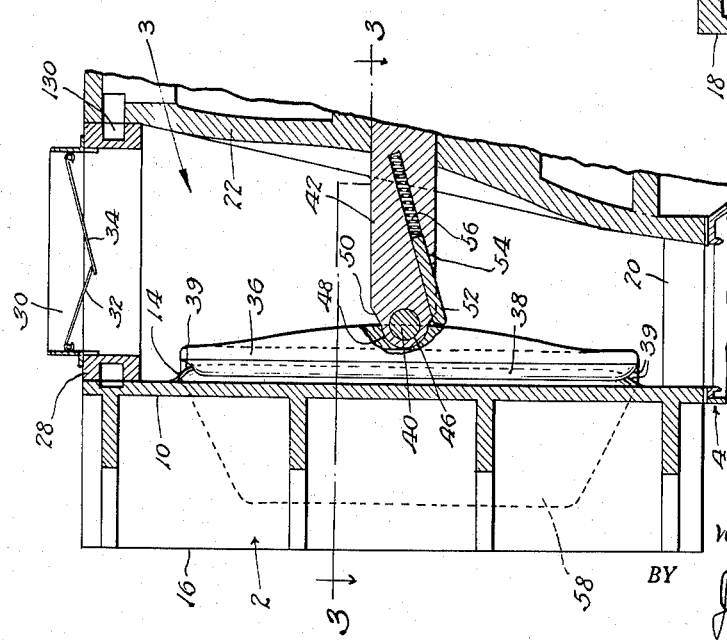
INVENTOR.
William F. Kammer
BY James H. Littlepage
ATTORNEY.

Oct. 11, 1955  W. F. KAMMER  2,720,161
JUICE MACHINE

Filed July 9, 1951  13 Sheets—Sheet 5

INVENTOR.
William F. Kammer
BY
James H. Littlepage
ATTORNEY.

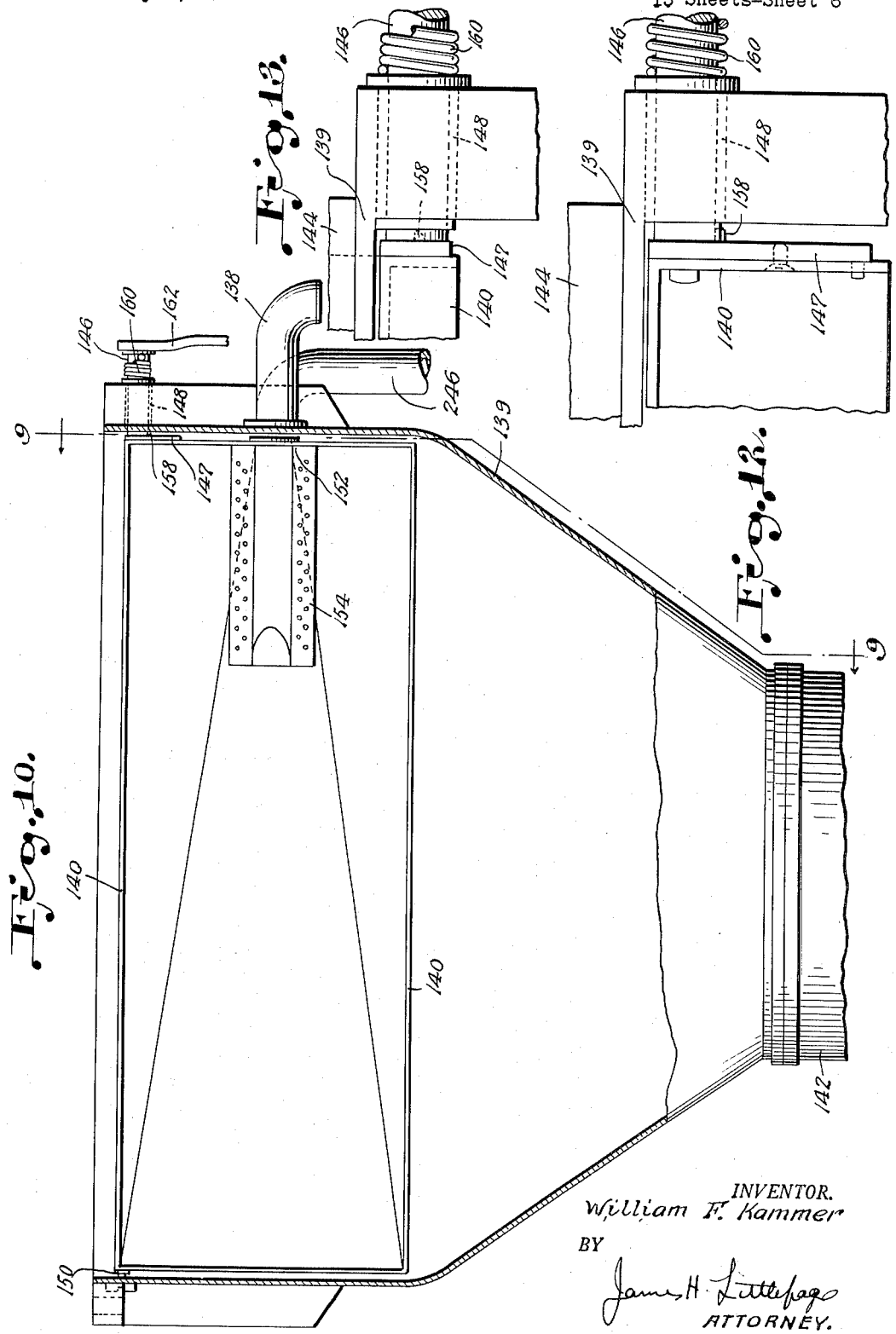

Oct. 11, 1955 W. F. KAMMER 2,720,161
JUICE MACHINE
Filed July 9, 1951 13 Sheets-Sheet 7
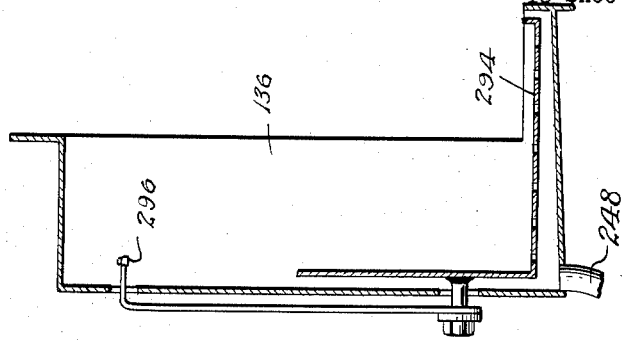
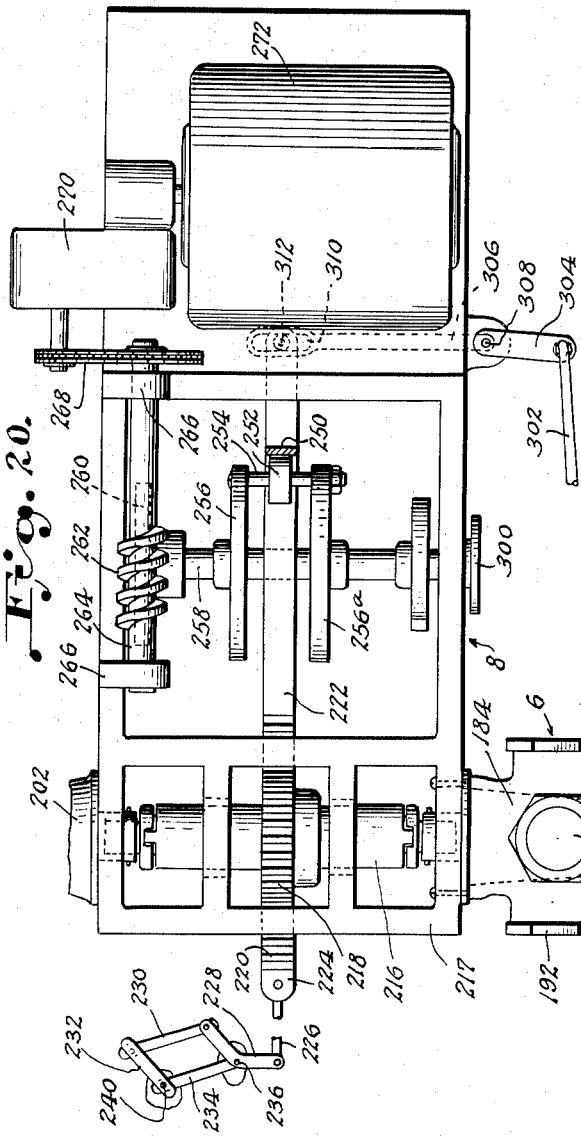
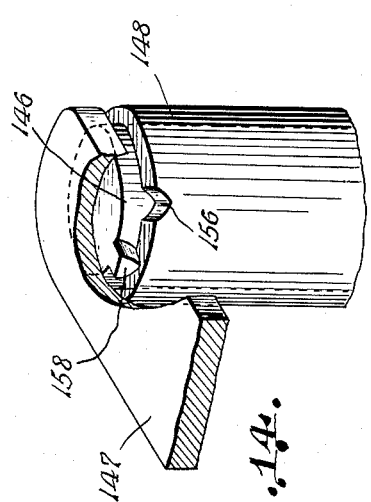
INVENTOR.
William F. Kammer
BY James H. Littlepage
ATTORNEY

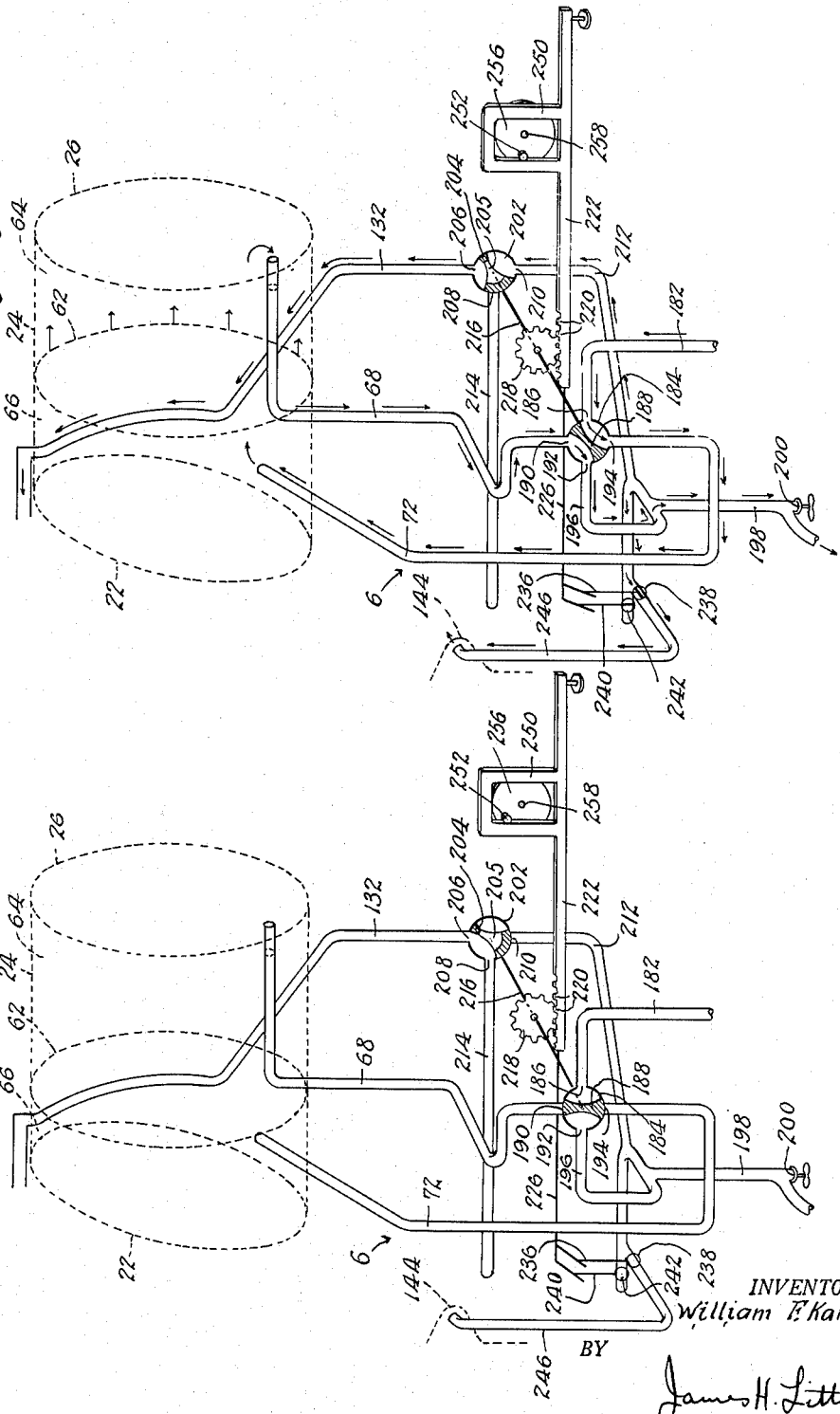

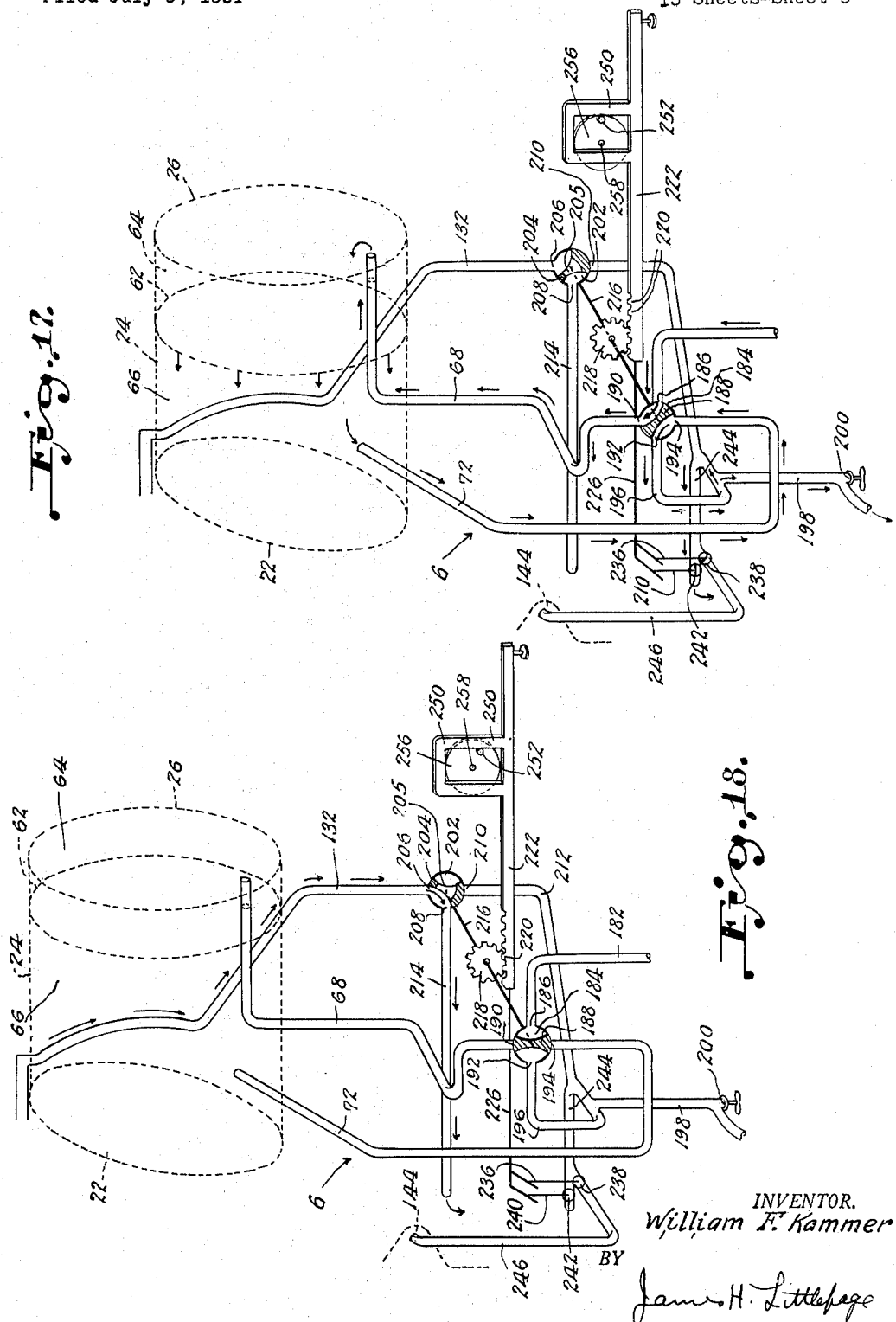

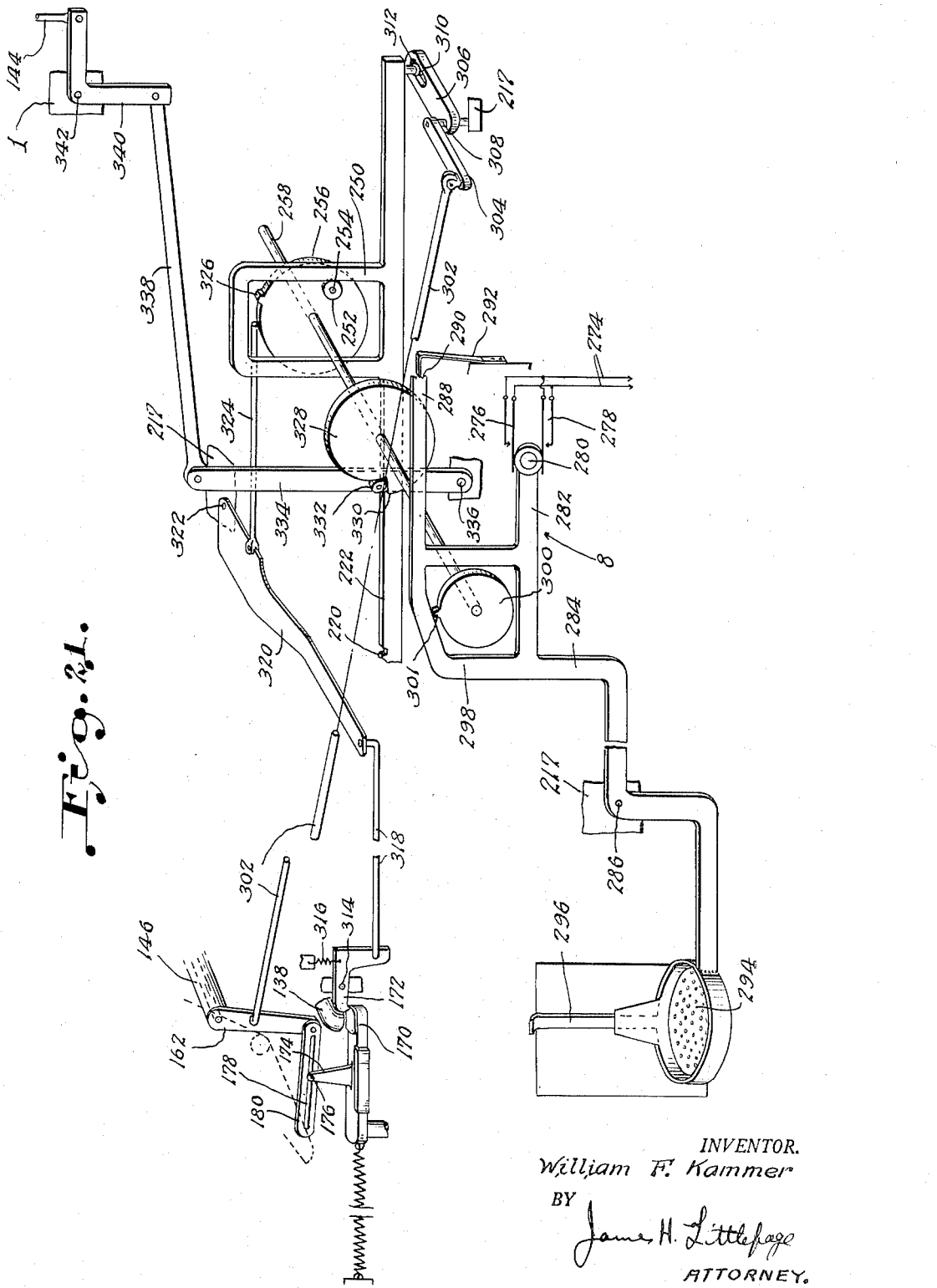

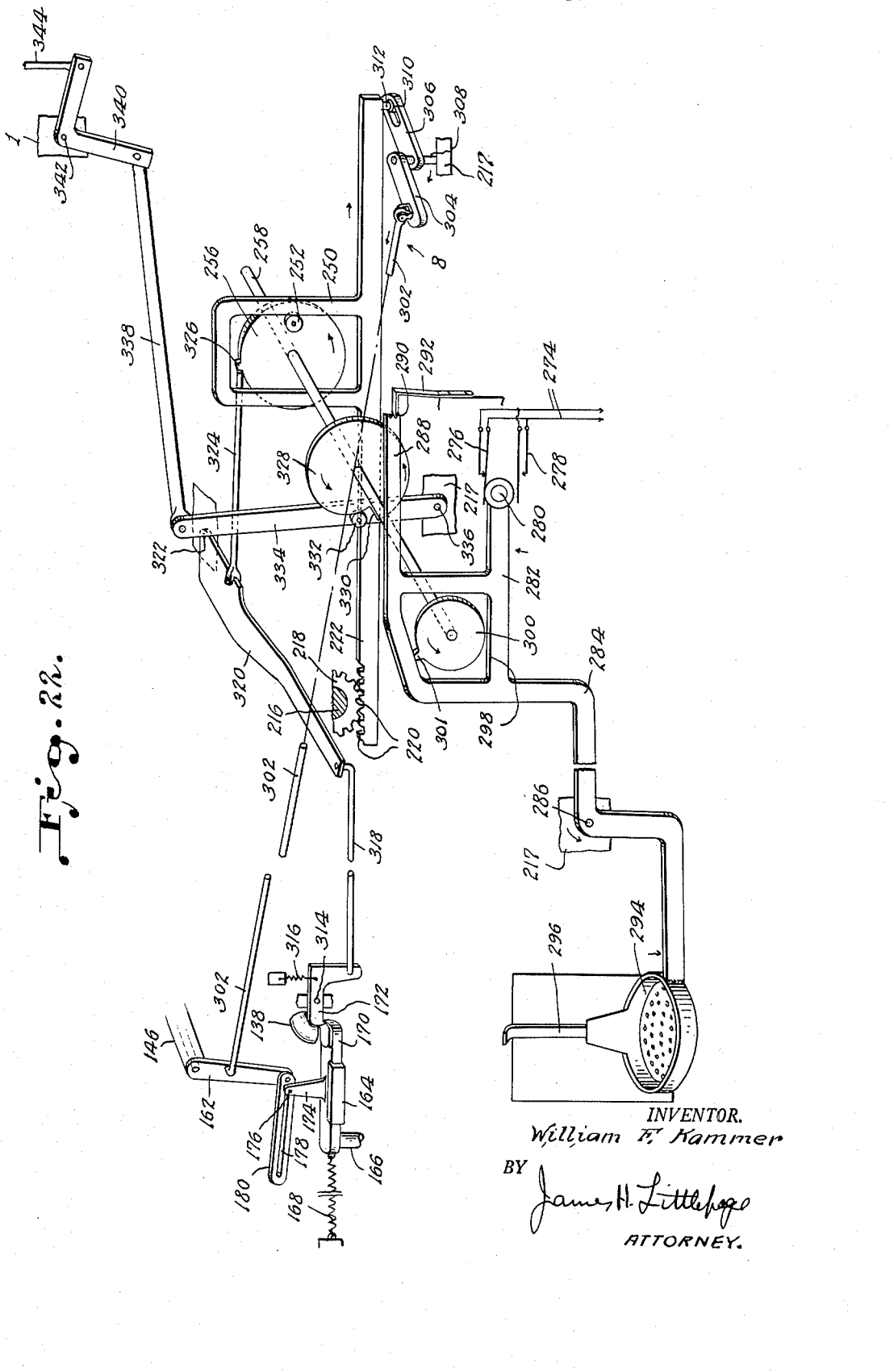

Oct. 11, 1955

W. F. KAMMER 2,720,161

JUICE MACHINE

Filed July 9, 1951

INVENTOR.
William F. Kammer
BY
James H. Littlepage
ATTORNEY.

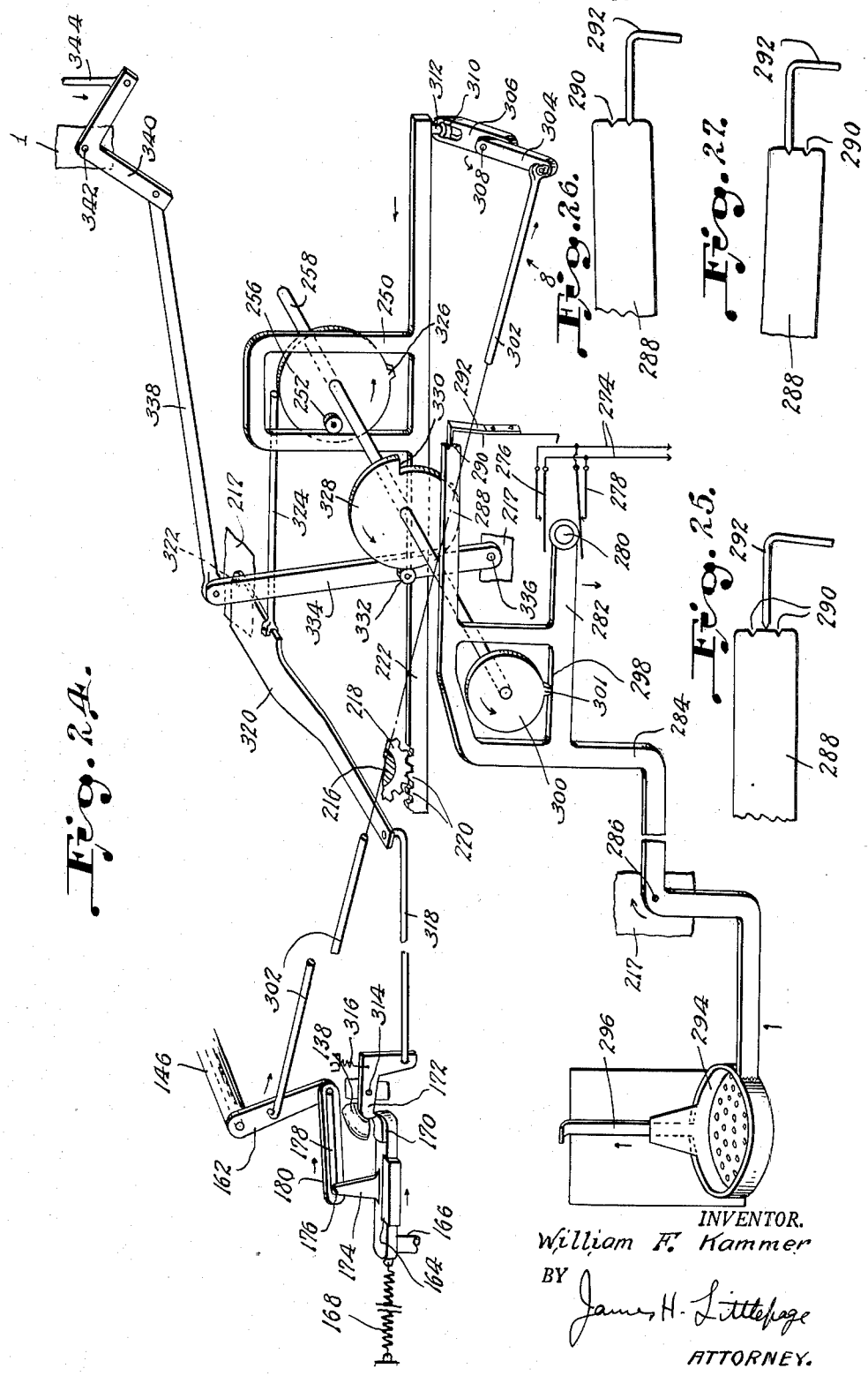

… … …

United States Patent Office 2,720,161
Patented Oct. 11, 1955

2,720,161

JUICE MACHINE

William Frank Kammer, Wenatchee, Wash.

Application July 9, 1951, Serial No. 235,749

9 Claims. (Cl. 100—102)

This invention relates to a juice-extracting machine and, more particularly, to a machine for crushing out the juice of fruits and vegetables of various consistency and size and which machine, when set into motion, automatically executes a multi-phase cycle of operation.

The primary object of the invention is to provide a juice-extracting machine for operation at the point of sale, so that the juice of a fruit may be extracted and immediately served ready for consumption. To accomplish this broad objective, it is intended to meet certain individual requirements, one being that the machine be capable of handling fruits varying in size from, for instance, a small apple to a grapefruit. The machine, fundamentally a crusher, must also be adjustable to accomplish the relatively complete crushing of fruit such as an apple, or the restrained crushing of citrus fruit so that the oil from the latter's skin will not be pressed out. Another requirement to be met in that the machine be sanitary and have provision for washing out the extracting chamber and active parts, and for flushing away the pulpy residue; and the consumer must be able to see that all is clean.

A particular object of the invention is to provide a crusher-type machine having mating, vertically grooved fixed and moveable jaws wherein the moveable jaw moves horizontally toward and away from the fixed one, and wherein the limits of forward and retractive movements may independently be predetermined. More particularly, it is now proposed that the forward or crushing movement of the moveable jaw may be pre-defined so that its working surface stops short of engagement with the opposite surface of the fixed jaw by a distance dependent upon the material, hereinafter generally termed "fruit," to be crushed. For example, it is intended to provide arbitrary and forward stop for apples at the point beyond which the pulp would squirt from between the jaws, and for citrus fruits, the moving jaw is stopped before further movement would express oil from the rind.

Another object is to provide a jaw crusher with provision for adjustably limiting the rearward travel of the moveable jaw so that the gap between the jaws approximates the diameter of the fruit. Associated with this concept is that of cocking one of the jaws about a horizontal axis when the jaws are open so that fruit dropped between them will lodge approximately mid-way between the tops and bottoms of the jaw surfaces. While it is intended that the cocking forces be sufficiently strong to prevent the fruit from prematurely straightening up the cocked jaw by gravitational forces, it is also an object that the cocking mechanism be yieldable so that as the jaws close, the cocked one will straighten up into parallelism with the other.

Along with the arrangement for holding fruit mid-way between the faces of a horizontally operating jaw crusher, the invention also contemplates the provision of panels on opposite sides of one of the jaws, with the panels arranged to fit over the opposite jaw so as to confine the fruit or pulp against lateral displacement, and also to act as splash guards. By making the panels of transparent material, full visibility of both the pressing and cleaning operations is afforded.

Yet another object is to provide for washing and flushing out all parts of machine which may come into contact with the fruit, juice, and pulp, and for flushing away the pulpy residue. In combination with a hydraulic cylinder and piston mechanism working off of the domestic water supply for advancing and retracting the crusher jaw, it is intended to utilize the exhaust of the piston and cylinder assembly for supplying the wash-water to a perforated washing manifold. After completion of the crushing and juice delivery phases of the operating cycle, the manifold drenches water over the extracting chamber and the crusher jaws, sidepanels, cocking mechanism, juice trap and associated structure. By utilizing a part of the water exhausted during the retractive stroke of the double-acting hydraulic piston, a sufficiently large slug of wash-water is assured. In addition, the use of a slug of water available only after the juice has been extracted and the glass or other receiving container has been removed from the juice delivery station is intended as one of the important safeguards against commingling of wash-water with the extracted juice. Another safeguard is the back-draining of the washing manifold after each washing operation so that no residual wash-water may drip down on the fruit or jaws during the crushing phase of the operating cycle.

Another feature of both the juice extracting and washing phases is the provision of vertical interfitting ribs which form the mating working faces on the crusher jaws, and the termination of the ribs in downwardly inclined surfaces so that neither juice nor water will stand or hang on the rib ends.

An additional object is to provide mechanical controlled doors for the upper, input side of the extracting chamber, the doors being openable only during the inactive loading phase of the operating cycle so that manual access to the jaws, when one of the latter is moving, is barred and so that neither juice nor wash-water may splash or squirt upwardly through the input opening during the washing and crushing phases.

Yet another object is to provide, below the juice-extracting chamber, a disposal unit into which the pulp and wash-water drops, a trap chamber at the upper end of the disposal unit, a juice delivery station lateral of the trap chamber, and a juice trap moveably mounted in the upper end of the trap chamber. The object of this arrangement is to direct the juice laterally to the delivery station by raising the trap, and to let the pulp and wash-water drop into the disposal unit by lowering the trap. In addition, it is an object of the invention to provide a drip catcher that is physically interposed under the oulet and of the juice delivery station during all times other than when juice is extracted so as to bar drippage of juice or wash-water from the delivery spout. Provision is made, however, for moving the drip catcher to an inoperative position whenever the crusher jaws close.

In connection with all the above objectives, an important feature of the invention is the provision of a co-ordinated hydraulic, mechanical and electrical control system wherein all of the juice producing and delivering mechanisms are set into motion, in proper sequence, by the act of placing a glass or analogous receptacle on a platform at the juice delivery station, and wherein all of the washing, flushing, and other operations necessary for re-readying the apparatus for the next operating cycle are instituted by removing the glass from the delivery station.

These and other objects will be apparent from the following specification and drawings, in which:

Figs. 1 and 1A are a side elevation of the entire assembly;

Fig. 3 is a horizontal fragmentary section taken along the line 3—3 of Fig. 4 looking in the direction of the arrows, showing the jaws in closed condition;

Fig. 4 is a fragmentary vertical section taken mid-way through Fig. 3 showing the jaws in closed condition;

Fig. 8 is a vertical transverse section taken along the line 8—8 of Fig. 2 looking in the direction of the arrows, taken through the pressing head assembly, with the back travel control chain removed;

Fig. 10 is an end elevation, partially broken away, showing the trap chamber with the trap fully retracted;

Fig. 12 is a fragmentary view showing the details of the trap pivotal mounting with the trap in its upper operating position;

Fig. 13 is a view similar to Fig. 12 but showing the trap retracted;

Fig. 14 is a fragmentary perspective, partially broken away, showing the details of the trap restraining notch and projection;

Fig. 15 is a vertical section taken through the glass alcove;

Fig. 16 is a diagram of the hydraulic control system with the latter in its normal or starting condition;

Fig. 17 is a diagram similar to Fig. 16 but showing the condition of the hydraulic control system during the "squeeze" phase of the operating cycle;

Fig. 18 is a diagram similar to Figs. 16 and 17 but showing the hydraulic control system during the "rest" phase of the operating cycle;

Fig. 19 is a diagram similar to 16, 17 and 18 but showing the hydraulic control system during the "wash" phase of the operating cycle;

Fig. 20 is a top-plan view of the mechanical control system, with parts of the control linkage removed;

Fig. 21 is a diagram of the mechanical control linkage during the normal or starting phase of the operating cycle (comparable to Figs. 1, 1A, 2, 10, and 16);

Fig. 22 is a diagram similar to Fig. 21 but showing the mechanical control linkage during the "squeeze" phase of the operating cycle (comparable to Fig. 17);

Fig. 23 is a diagram similar to Figs. 21 and 22 but showing the "rest" phase of the operating cycle (comparable to Fig. 18);

Fig. 24 is a diagram similar to Figs. 21, 22 and 23, but showing the control linkage during the "wash" phase of the operating cycle (comparable to Fig. 19);

Figs. 25, 26 and 27 are enlarged fragmentary views showing the detail of the spring finger retaining mechanism in the conditions of Figs. 21 and 24, 22, and 23, respectively;

And Fig. 28 is an enlarged detailed showing of the door operating mechanism.

*General operation*

Figure 2:
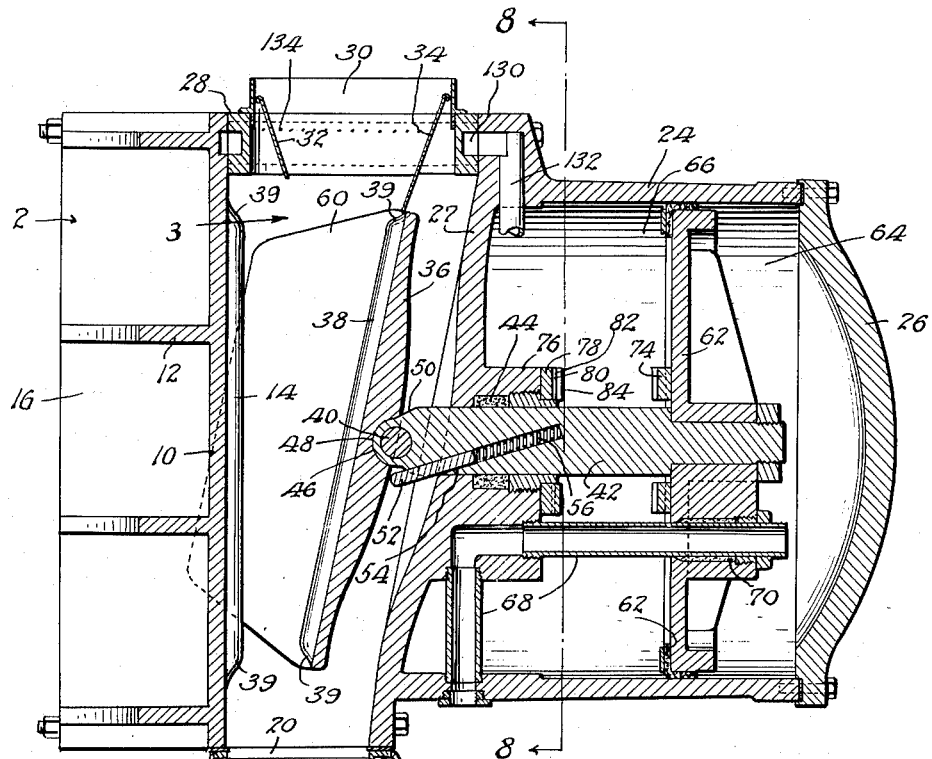
Fig. 2 is a vertical section taken through the pressing head and showing the juice trap chamber partially broken away.

Referring now to the drawings in which like reference numerals denote the same or substantially similar elements, the juice machine is supported in a frame 1 adapted to rest on a floor or other suitable mounting, the machine being comprised of four cooperating and interrelated units, namely, pressing head 2 operating in a crushing chamber denoted generally at 3 in Fig. 2, distribution and delivery section 4, hydraulic control system 6, and mechanical control linkage 8. Broadly speaking, the function of the pressing head is to squeeze out the juice from a fruit, and the juice drains downwardly to the distribution and delivery section 4. During the juice-extracting operation of the pressing head, distribution and delivery section 4 directs the extract juice to a glass or similar receptacle. After the juice-extracting operation of pressing head 2, the hydraulic control system retracts the pressing head and the distribution and delivery section 4 is conditioned to direct the pulpy residue and forth-coming wash-water to a pulp-disposal unit. Thereupon the hydraulic control system directs wash-water so as to clean off the exposed portion of the pressing head and to flush out the distribution and delivery section 4. The complete cycle of operation is under the positive automatic actuation of mechanical control linkage indicated generally at 8, and the various operations of mechanical control linkage 8 are instituted by the consumer when he place a glass in juice-receiving position and again when he removes the filled glass. As will be apparent hereinafter, the power for operating the pressing head is obtaint from a domestic water supply and the power for operating the mechanical control linkage is obtained from the domestic electrical supply system.

*Pressing head*

Referring specifically to the pressing head 2, illustrated best in Figs. 1 to 8, inclusive, there is at one end a fixed jaw 10 secured by bolts 11 inside frame 1 at the upper left-hand portion of the assembly. The back of fixed jaw 10 is reinforced by webs 12 and on the front face are vertically running ribs 14 which form a corrugated working face. Rearwardly from the front and rear edges of fixed jaw 10 extend flared sides 16 terminating in forwardly hooked L flanges 18, best shown in Fig. 3. Glass windows 19 secured to flanges 18 and corresponding flanges around the crushing chamber are disposed on the front and rear sides.

At the lower portion of fixed jaw 10 there is a laterally disposed throat 20 spacing fixed jaw 10 from an upwardly inclined partition plate 22 which forms one end member for a hydraulic cylinder 24, the latter having on its opposite end a removable head 26.

The upper portions of fixed jaw 10 and partition plate 22 are spaced by an annular washing manifold 28 disposed in registry with and immediately below an entrance collar 30 through which fruit may be dropped when pivoted doors 32, 34 are opened downwardly. As will be apparent, doors 32, 34 are open only when the machine is in readiness to commence an extracting cycle of operation, and immediately before extracting starts, the doors automatically closed so as to protect the operator and to prevent outward squirting of extracted juice or, subsequently, to prevent outward splashing of wash-water.

Opposite fixed jaw 10 there is a horizontally moveable jaw 36, also corrugated on its working face, with vertical ribs 38 interengaging between the vertical ribs 14 on the fixed jaw, it being apparent that the vertical ribs on both jaws not only extend the working surface but also provide vertical drainage for extracted juice, pulp, and wash-water. The ribs 14 and 38 are bevelled at their upper and lower ends as indicated at 39 to prevent liquid or pulp from hanging on.

Approximately at its center, moveable jaw 36 is horizontally pivoted by pin 40 to the free end of a piston rod 42, the latter sliding through a packed bearing 44 in plate 22. It is to be particularly noted in Figs. 2 and 4 that the back face of moveable jaw 36 is provided with an arcuate socket 46 in which fits the arcuate end 48 of piston rod 42, and that the piston rod has a shoulder 50 engageable with the back face of moveable jaw 36 to limit the clockwise pivoted movement of the moveable jaw, the latter of which is biased clockwise by a cocking pin 52 sliding in an angular bore 54 in piston rod 42. Cocking pin 52 is spring pressed outwardly by an expansion spring 56 in the inner end of angular bore 54 so that when cocking pin 52 presses against the back face of moveable jaw 36 below its pivot pin 40, the moveable jaw is cocked clockwise until the juncture of its back face and arcuate socket 46 engages with shoulder 50 on piston rod 42. It is thus apparent that the clockwise cocking of moveable jaw 38 swings its lower portion towards fixed jaw 10, thereby forming a wedge-shaped pocket so that fruit dropped through entrance collar 30 will lodge between the fixed and moveable jaws. As will be seen, the extent of retraction of moveable jaw 38 may be varied in accordance with the size of the fruit to be squeezed so that, with proper adjustment of the retracted position of moveable jaw 38, fruit will lodge approximately between the upper and lower edges of the jaws. As seen in Figs. 1, 3 and 4, transparent plastic side panels 58 and 60 are affixed to the front and rear vertical edges of moveable jaw 36. The side panels flare outwardly so as to nest over the flared side 16 of fixed jaw 10 when the jaws are closed. Transparent plastic side panels 58 prevent lateral dislodgement of the fruit as it is squeezed and also prevent outward squirting of the juices while permitting full view of the squeezing and washing operations.

Referring particularly to Figs. 2 to 7, inclusive, piston rod 42 and, of course, moveable jaw 38 are hydraulically driven by a piston 62 affixed on the inner end of the piston rod. For purposes of explanation, the space between piston 62 and cylinder head 26 has been designated pressure stroke side 64, while the space between piston 62 and partition 22 is the return stroke side 66. Water from the hydraulic control system 6 is conducted to the pressure stroke side 64 of piston 62 by a water conduit 68, the free end portion of which slides in a packed aperture 70 through piston 62. For the return stroke side 66 of cylinder 24, there is a water conduit 72, which forms a part of hydraulic control system 6, it being apparent that piston 62 is driven to the left during its pressure stroke by water input through conduit 68 while water on the return stroke side 66 is being exhausted through conduit 72; during retraction of piston 62 and its attached parts, water under pressure is input through conduit 72 to return stroke side 66 while pressure stroke side 64 exhausts through conduit 68.

Figure 5:
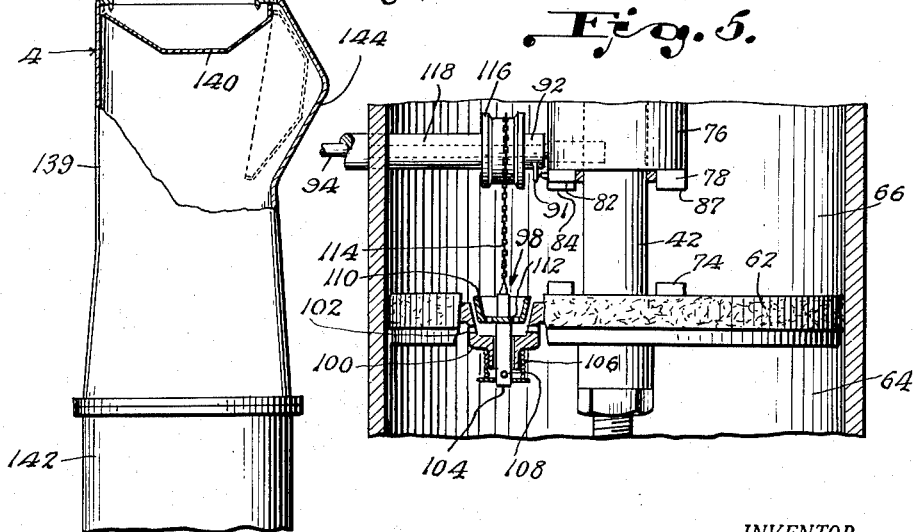
Fig. 5 is a fragmentary horizontal section showing the details of the piston and back travel and forward motion stop mechanisms.
Figure 11:
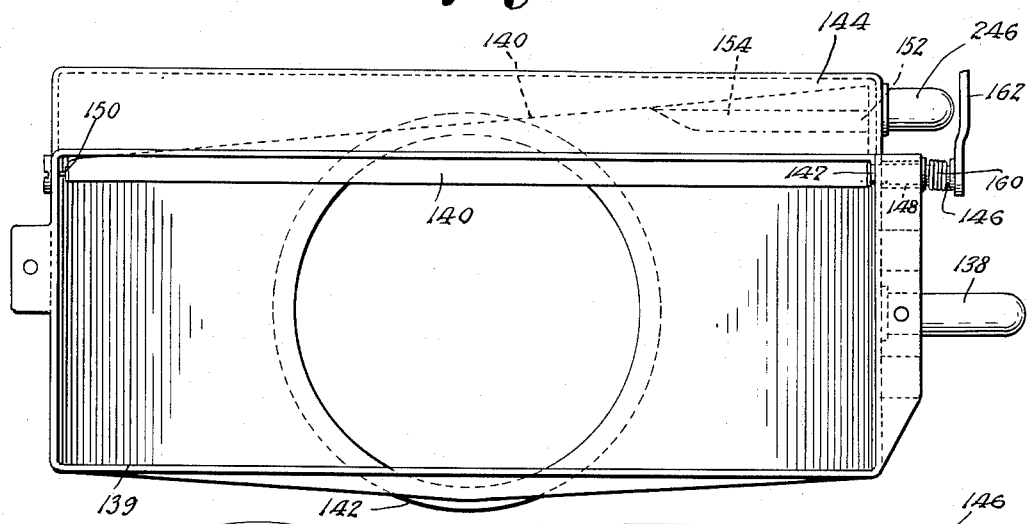
Fig. 11 is a top-plan view of the trap chamber per se with part of the retracted trap shown in dash lines.
Figure 6:
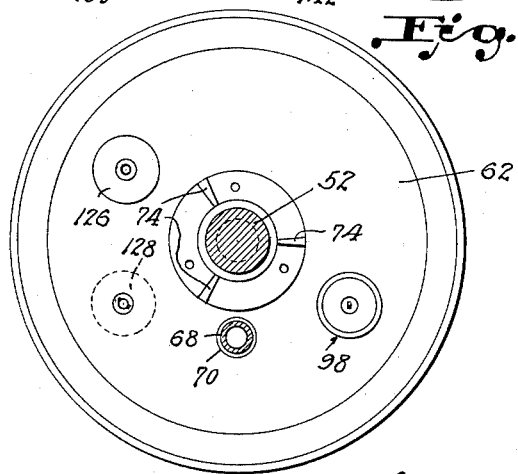
Fig. 6 is a front elevation, partially in section, showing the forward face of the piston.

In order to limit the extent to which moveable jaw 36 may be driven towards fixed jaw 14 in accordance with the nature and consistency of the fruit being pressed, there are affixed annularly spaced forward stops 74 on the forward face of piston 62 (Figs. 2, 5 and 6). On a boss 76 integral with the rear side of partition 22 is rotatably supported a stop ring 78 having a base working surface 80 and angularly spaced pairs of step stops 82 and 84 of respectively increasing height above base surface 80. From Figs. 2, 5 and 8, it will be apparent that if stop ring 78 is adjusted so that its base surfaces 80 are laterally opposite stops 74 on piston 62, the latter will go forward on its pressure stroke to its fullest extent in which the working surface of moveable jaw 36 is closely spaced from the working surface of fixed jaw 10; if stop ring 78 is turned so that stop steps 82 are engaged by forward stops 74 on piston 62, the latter will travel forwardly a somewhat less maximum distance and forward travel of piston 62 can be further decreased by turning stop ring 78 so that stop steps 84 are engaged by forward stops 74 on piston 62. Stop ring 78 is yieldably restrained in the angular position to which it is set by a spring-pressed ball (not shown) carried by boss 76 engaging in apertures in stop ring 78.

Stop ring 78 is angularly adjusted by a link 86 pivoted at 88 to periphery of stop ring 78 and pivotally connected to a stub crank arm 91 on a collar 92, the latter being an enlargement on a shaft 94 rotatably supported at its inner end on a suitable bearing in boss 76 and having its reduced outer end 94 extending externally of cylinder 24 and terminating in a control knob 96 (Figs. 2, 5 and 8).

In order to limit the forward travel of moveable jaw 36 to any one of the three extreme positions, control knob 96 may be turned to any one of three corresponding angular positions so as to render operative, as stop members, base surfaces 80, stop steps 82, or stop steps 84.

As detailed in Figs. 5 and 8, and in order to engage fruit of various size mid-way between fixed and moveable jaws 36 and 10 respectively, there is provided a control mechanism for limiting the back travel of piston 62, thereby to adjust the maximum gap between fixed jaw 14 and the then-cocked moveable jaw 38. A normally closed back-travel control valve indicated generally at 98 includes a cage 100 affixed in an aperture through piston 62 and provided with ports 102 extending laterally through the tapering cylindrical side wall of cage 100. Slidably supported in the base of cage 100, valve stem 104 is normally biased so that compression spring 106 engaging pin 108 in valve stem 104 biases the latter so that tapering cylindrical valve 110 normally seats in tapering cylindrical cage 100. Since the ports 112 extend through the base of valve 110 and since the ports 102 in cage 100 extend laterally through the side wall of the latter, no communication exists through ports 102 and 112 when valve 110 is closed and, because of the port arrangement, hydraulic pressure exerts no significant opening force on the valve. The normally closed valve 110 has attached to its stem 104 a chain 114 and when piston 62 retracts far enough, chain 114 becomes taut and cracks valve 110 off its seat in cage 100. Obviously, the effective length of chain 114 will determine the extent of back travel of piston 62 since, when valve 110 opens, both sides 64 and 66 of cylinder 24 are in direct communication with one another. Chain 114 is secured around a drum 116 and the latter is affixed on hollow shaft 118 rotatable around shaft 94 extending forwardly to the exterior of the machine to terminate in a control lever 120. The free end of the control lever rides over an arcuate strip 122 having angularly spaced stop holes 124 so that a projection (not shown) on the underside of control lever 120 snaps from hold to hold upon manual actuation. The angular disposition of control lever 120 determines the effective length of chain 114 and, in turn, governs the extent of back travel of piston 62 and moveable jaw 38. Suitable indicia may be provided on or adjacent arcuate strip 122 so that the operator may set the back-travel control lever 120 in accordance with the size of the fruit to be lodged between fixed and moveable jaws 14 and 36 respectively.

Figure 7:
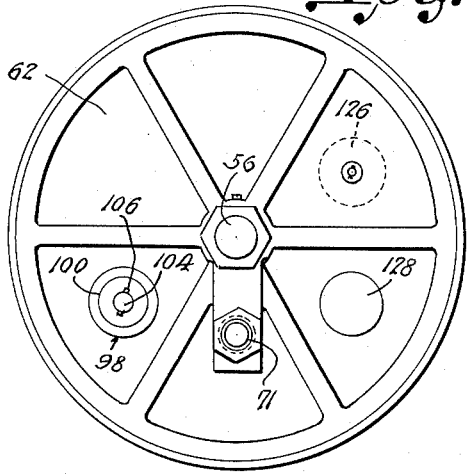
Fig. 7 is a rear elevation showing the rear section of the piston.
Figure 9:
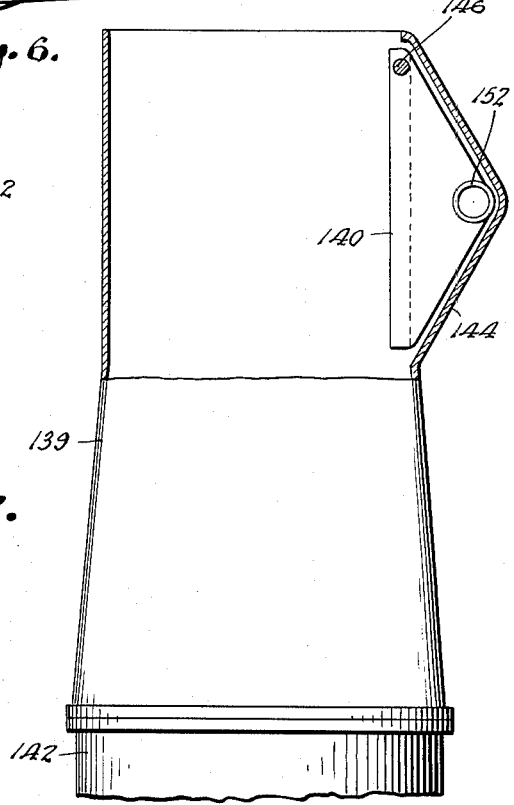
Fig. 9 is a side elevation, partially in section along the line 9—9 of Fig. 12 showing the trap chamber and trap in fully retracted position.

As shown in Figs. 6 and 7, piston 62 is also provided with spring-loaded safety valves facing in opposite directions from one another and conventionally adjustable to pop off at arbitrary maximum pressures to prevent damage to the piston, jaws, and associated parts if, for any reason, excessive pressures develop.

Referring particularly to Figs. 1, 2 and 8, there is disposed, in the upper part of the pressing head 2, a washing manifold 28 having an annular chamber 130 with internally facing small holes 134 closely spaced about its inner periphery. It may be noted that small holes 134 register with the uppermost portion of annular chamber 130 so as to prevent dribbling or dripping of wash-water after the supply of water to the washing manifold is cut off, the latter supply being effected through manifold inlet pipe 132. From the disposition of washing manifold 28 and small holes 134, it will be apparent that wash-water input through inlet pipe 132 will spray down and drench the working surface 14 of fixed jaw 10 and both sides of moveable jaw 36, as well as the free end portion of piston rod 42 and cocking pin 52 and, in fact, all of the parts with which contamination might otherwise be a problem. However, when the wash-water supply is turned off, water standing in chamber 130 of manifold 28 drains backwardly through inlet pipe 132.

*Distribution and delivery section*

Referring now to the distribution and delivery section generally indicated at 4, and shown best in Figs. 1A, 2, and Figs. 9 to 15, inclusive, there is in the forward portion a glass alcove 136 in which the consumer places a glass to receive the juice, the latter pouring into the glass through a juice spout 138 extending forwardly through the wall of a trap chamber 139 having slidably mounted in the upper part thereof a juice trap 140.

Juice trap 140, which is normally disposed in an intermediate position indicated by dotted lines in Fig. 2, is moveable upwardly to a first operative position shown in full lines in Fig. 2 in which it extends across the lower end of throat 20 and thereby catches juice draining from the fruit pressed between the jaws 10 and 36. Trap 140 is moveable also to a second operative fully retracted position shown in Figs. 9, 10 and 11, in which it unblocks throat 20 and allows the wash-water and pulpy residue draining from jaws 10 and 36 to drop directly through to a chamber 142 containing a garbage disposal unit (not detailed).

Referring now to Figs. 10, 12, 13 and 14, juice trap 140 has affixed at one corner a supporting and driving arm 147 rigidly affixed on the end of a shaft 146, the latter of which is rotatably supported in a shaft bushing 148 extending through the wall of trap chamber 139. The laterally opposite corner of the juice trap is supported by a longitudinally slidable pivot 150. The juice trap is formed so that when horizontally disposed, it will drain towards its funnel end 152 through a false bottom consisting of a strainer 154. Funnel end 152, when juice trap 140 is in its upper operative position, registers and fits closely with the upper end of juice spout 138 so that all juice dropping from pressing head 2 is caught, strained, and drained directly into glass alcove 136. In order to retain juice trap 140 in its upper operative position until positively actuated therefrom and to fit funnel end 152 into juice spout 138, shaft bushing 148 has on its inner end a notch 156 into which a projection 158 on shaft 146 drops. Shaft 146 is longitudinally slidable in bushing 148 to a limited extent and biased by a compression spring 160 so as to urge projection 158 into notch 156 when the latter two members come into registry. Spring 160 is slightly compressed between the outer end of shaft bushing 148 and the juice trap operating arm 162 rigidly affixed on the outer end of shaft 146.

In order to prevent juice from dripping into glass alcove 136 at undesired times, a drip catcher 164, detailed in Figs. 1A and 21 to 24, inclusive, is slidably supported in a slideway 165 on the top of glass alcove 136, the top wall having an opening (not shown) therein immediately below the juice spout 138. In its operative position, drip catcher 164, which is a hollow, open-top closed-bottomed slide, receives drippage from juice spout 138, the latter of which drains longitudinally through the drip catcher and out through flexible drain tube 166 to a sewage connection. The juice trap is biased by a tension spring 168 connected at one end to frame 1 and at its other end to an ear 174 on the juice trap so that when the latter is released, it slides from beneath juice spout 138.

The open-top drip receiving end 170 of drip catcher 164 is normally retained beneath juice spout by catch 172. As shown best in Figs. 1A and 21 to 24, inclusive, the drip catcher has near its middle the upwardly extending ear 174 with a transversely extending pin 176 at the upper end, the pin riding in a slot 178 extending lengthwise in a link 180 and the latter is pivoted to the free end of the operating lever 162 of juice trap 140. The connection between the drip catcher 164 and juice trap 140 is thus one of lost motion so that whenever the juice trap is swung down to its fully retracted position, the left-hand end of slot 178 in link 180 engages pin 176, if the drip catcher is in its inoperative position, thereby to slide drip catcher 164 to the right as seen in Figs. 23 and 24 against the bias of spring 168 so that the right-hand edge of the drip catcher snaps beneath catch 172. Under all other conditions, drip catcher 164 is free to slide to its inoperative position whenever released by catch 172.

*Hydraulic control system*

Hydraulic control system 6 receives water under pressure for driving piston 62 and for washing and flushing the various parts from water supply pipe 182 connected to a domestic water supply system. Input of water from supply pipe 182 is controlled by a three-way piston control valve 184 having an inlet port 186, an hourglass shaped rotor 188, and outlet ports 190, 192 and 194 respectively spaced at 90° intervals. Outlet port 190 is connected to water conduit 63 leading from the pressure stroke side 64 of piston 62 so that whenever port 190 communicates with water supply port 186, piston 62 is driven on its pressure stroke. Normally, rotor 188 closes port 190, as illustrated in Fig. 16 in which the off-condition for the machine is diagrammed. Fig. 17 diagrammatically illustrates the condition of a system during the pressure stroke of "squeeze" phase of the operation wherein water supply port 186 communicates through piston control valve 184 with outlet port 190.

In the "squeeze" phase shown in diagram in Fig. 17, it should be noted that water conduit 72 leading from return stroke side 66 of cylinder 24 communicates through ports 194 and 192 to a cylinder outlet pipe 196 connected to outlet pipe 198, the flow through the latter being under control of a by-pass control valve 200, which varies the back pressure in outlet pipe 198, the latter leading eventually to a sewage connection.

In its third characteristic position, during the "rest" phase of operation shown in the diagram of Fig. 18, piston control valve 184 returns to its starting condition as in Fig. 16. Finally, piston control valve 184 connects inlet port 186 with outlet port 194 so as to pass water from inlet pipe 182 through conduit 72 to the return stroke side 66 of cylinder 24, thus to drive piston 62 on its back stroke. This condition is illustrated in Fig. 19, wherein it will be noted that now conduit 68 from pressure stroke side 64 of cylinder 24 is connected through port 192 to cylinder outlet pipe 196.

Controlled simultaneously with piston control valve 184 is another three-way valve, namely, wash valve 202, the rotor 204 of which has a central passage 205 so that, essentially, rotor 204 serves to block one port only for any given position of the valve. Port 206 of wash valve 202 connects through manifold inlet pipe 132 to wash manifold 28. Port 208 of wash valve 202 leads through manifold drain pipe 214 to a sewage connection. Port 210 of wash valve 202 leads through wash-water supply pipe 212 to a connection with cylinder outlet pipe 196 so that outlet water under back pressure resulting from partially closed by-pass valve 200 in outlet pipe 198, under certain conditions, passes through wash valve 202 and through manifold inlet pipe 132 to wash manifold 28. The varying functions of valve 202 may be ascertained by comparing Figs. 16 to 19 with one another. In Figs. 16 and 17, illustrating the starting and "squeeze" phases of the operating cycle, wash manifold 28 drains backwardly through manifold inlet pipe 132, through valve 202 and out through manifold drain pipe 214 while inlet port 210 is blocked by rotor 204. This condition maintains throughout the operation of the machine up to the final or "wash" phase illustrated in Fig. 19, wherein water exhausted from pressure stroke side 64 of cylinder 24 passes by a conduit 68, valve 184, cylinder outlet pipe 196 and wash-water supply pipe 212 through wash valve 202 and up to 132 to manifold 28. It is thus apparent that a definite slug of water, i. e., the amount exhausted of pressure stroke side 64 of cylinder 24 (minus a certain amount bled off from connections described below) is utilized for flushing out the necessary portions of pressing head.

Particularly referring to Figs. 1A and 20, the rotors 188 and 204 of valves 184 and 202 respectively are simultaneously driven by a common drive shaft 216 rotatably supported in a subchassis 217, the drive being effected by a pinion 218 affixed around shaft 216. Pinion 218 is driven by rack-teeth 220 on a longitudinally moveable rack bar 222 the free end 224 of which has pivoted to it a rod 226. On the free end of rod 226 is pivoted a lever 228 which forms a part of a deformable parallelogram completed by links 230, 232 and 234. The pivot connecting link 232 with link 234 is constituted by the upper end of a valve shaft 240 rigid with link 237 whereas the pivot connecting 236 and lever 228 is the upper end of a valve shaft 236 rigidly connected with lever 228. Thus, when the rod 226 moves lengthwise with rack 222, lever 228 and link 232 are rocked about their pivotal connections, thereby rotating valve stems 236 and 240.

As shown in the hydraulic system diagrams, Figs. 16 to 19, a branch pipe 244 leads from a connection with cylinder outlet pipe 196 and eventually flows into the lower portion of glass alcove 136 and the latter is drained through a sewage connection 248 so that a certain remainder of the slug of water exhausted from return stroke side 66 of cylinder 24 is relegated for washing out the lower portion of glass alcove 136. However, a juice trap wash pipe 246 leads from branch pipe 244 so that a certain other part of the remainder of the exhausted slug of water is directed to trap pocket 144 of trap chamber 139 so as to flush off juice trap 140, the latter being retracted into pocket 144 at the time when the slug remainder passes through juice trap wash pipe 246. Valves 238 and 242 respectively controlled by the rotation of their stems 236 and 240 are mounted in branch pipe 244, near its end, and in juice trap wash pipe 246, the valves being adjusted so that whenever one is closed, the other is open. Therefore, a certain remainder of the exhaust slug to return stroke side 66 of cylinder 24 is directed through valve 242 to flush out glass alcove 136 as shown in Fig. 17 whereas a remaining portion of the slug of the water exhausted from pressure stroke side 64 of cylinder 24 is split with part going through wash water supply pipe 212 and manifold inlet pipe 132 to wash manifold 28; another part of this remainder flows through branch pipe 244 and valve 238 and juice trap wash pipe 246 to wash off juice trap 140 and its trap chamber 139, as shown in Fig. 19.

Summarizing the functions of hydraulic control system 6, water is fed in through water supply pipe 182 and alternatively directed by valve 184 to the pressure stroke or return stroke sides 64 or 66 of cylinder 24. Water exhausted from return stroke side 66 of cylinder 24 flows through valve 184 with part of the exhaust water draining through pipe 198 but another part flowing through branch pipe 244 and valve 242 to flush glass alcove 136. Water exhausted from pressure stroke side 64 of cylinder 24 passes through valve 184 and is split three ways, part being drained through pipe 198, another part passing through valve 202 to wash manifold 28, and the remaining part passing through valve 238 to flush off juice trap 140 and trap chamber 139.

*Mechanical control linkage*

The control of rack bar 222, which controls the entire hydraulic system 6, is accomplished through mechanical control linkage 8. Mechanical control linkage 8 and its cycle of operation are detailed in Figs. 20 to 28, wherein it will be seen that rack bar 222 has intermediate its ends an upstanding frame 250 within which works a roller 252 secured by a crank pin 254 on a cam 256. For purposes of mechanical convenience, cam 256 is formed as a double part, including a second cam member 256-A, between which cam members crank pin 254 extends. Both cam members 256 and 256-A are fixed on a cam shaft 258 rotatably mounted by bearings near its ends on subchassis 217.

Cam shaft 258 is driven by a helical gear 260 meshing with a worm 262 affixed on worm shaft 264, the latter being supported near its ends on subchassis 217 by bearings 266. A chain drive 268 on one end of worm shaft 264 is drivingly connected through a gear box 270 to an electric drive motor 272, it being understood that the drive motor as well as the electric motor (not shown) for driving the pulp disposing unit are energized from a suitable source of electricity such as a domestic electric power supply.

The simultaneous energization and de-energization of electric drive motor 272 and the pulp disposal unit motor is accomplished by a pair of normally open switches 276 and 278, respectively, the closing of either effecting energization of electric drive motor 272 and the pulp disposal unit motor. As diagrammed in Figs. 21 to 24, switches 276 and 278 are arranged back to back with their armatures engaged by a roller 280 floating therebetween, the roller being on the end of a fork 282 on a switch actuating lever 284 pivoted at 286 to subchassis 217. The upper fork 288 of switch actuating lever 284 has on its end vertically spaced notches 290 yieldably engaged by a spring finger 292 affixed on subchassis 217 so that switch actuating lever 284 is yieldably retained in an upper or lower position until positively moved therefrom. The retaining structure is detailed in Figs. 25, 26 and 27. It is apparent that so long as switch actuating lever 284 is in its intermediate position both switches 276 and 278 will remain open but if the forked end of the switch operating lever is either to its upper position or to its lower position, switch 276 or 278 will correspondingly close the circuit.

The portion of switch actuating lever 284 extending beyond pivot 286 extends freely into glass alcove 136 and carries in its end glass holder 294 having an upwardly extending bent bracket 296. When a glass is placed in holder 294, switch actuating lever 284 is rocked clockwise about its pivot 286, as diagrammed in Fig. 22, so that its forked ends 282 and 288 assume their upper position; switch 276 is then closed, and will remain closed because of the engagement of spring finger 292 in the lower one of notches 290 until actuating lever 284 is rocked clockwise. In the normal cycle of operation, clockwise rocking of lever 284 back to its intermediate position is accomplished by engagement of the lower side of a frame 298 by a nose 301 on a cam 300 affixed on cam shaft 258.

*"Squeeze" phase*

As will be understood by comparing Fig. 21 with Fig. 22, operation of mechanical control linkage is instituted by placing a glass on platform 294 whereupon switch actuating lever 284 rocks counter-clockwise to place forked ends 282 and 288 in their upper positions and thus to close switch 276 and energize electric drive motor 272 as well as the pulp disposal unit motor. Cam shaft 258 thereupon rotates counter-clockwise and roller 252 on cam 256 engages the right-hand side of frame 250 so as to retract rack bar 222. Retraction of rack bar 222 rotates pinion 218 of valve rotor shaft 216, thus to direct water under pressure to pressure stroke side 64 of cylinder 24 as illustrated in Fig. 17. The "squeeze" phase of the cycle continues until nose 301 on cam 300 rotates approximately 180 degrees to engage the lower side 298 on switch actuating lever 284, thereby rotating the latter clockwise until roller 280 on forked end 282 reaches its intermediate position, thereby opening switch 276.

Meanwhile, during the "squeeze" phase of the cycle, mechanical control linkage 8 has performed three other functions: first, juice trap 140 has been raised to its uppermost position, where it intercepts juice dropping from between closing jaws 10 and 36 and directs it through spout 138 into the glass then resting on glass holder 294; second, drip catcher 164 is released by catch 172 and pulled sidewise by spring 168 so as not to interfere with the juice pouring from spout 138. Fig. 22 illustrates the drip catcher just prior to its release. Third, doors 32, 34 are closed.

The actuation of juice trap 140 to its upper position is accomplished by a rod 302 pivoted at one end to juice trap operating lever 162 and at its other end to an arm 304 rigidly connected to a lever 306 by an intermediate pivot 308. Pivot 308 supports both the arm 304 and lever 306 on subchassis 217. The free end of lever 306 has a slot 310 in which slides a pin 312 on the rear end of rack bar 222. Thus, during the "squeeze" phase of operation, when rack bar 222 is driven to the right by roller 252 on cam 256, rod 302 is pushed to the left so as to swing juice trap operating lever 162 clockwise about its pivotal axis, thereby swinging juice trap 140 to its uppermost position, where the latter is retained by notch and projection 156, 158.

Drip catcher catch 172, which is normally biased to rock about pivot 314 counter-clockwise by spring 316, is rockable clockwise to release drip catcher 170 by left-hand movement of a push rod 318 pivoted to the end of an arm 320, the opposite end of which arm is pivoted at 322 to subchassis 217. Lever 320 is swung to the left as seen in Figs. 22 and 23 by push rod 324 when the latter is engaged by a nose 326 on cam 256. Thus, soon after cam 256 starts its rotation during the "squeeze" phase of operation, drip catcher 170 is slid to its left-hand inoperative position upon its release by catch 172.

Doors 32, 34 are closed by the forces of a cam 328 also fixed on cam shaft 258. At the start of the "squeeze" cycle, a ledge 330 on cam 328 accommodates a cam follower 332 on lever 334, the latter being pivoted at its lower end 336 to subchassis 217. The upper end of lever 334 is connected to the doors by linkage including pull rod 338, a lever 340 pivoted to frame 1 at 342, a second pull rod 344 extending upwardly to near the top of frame 1 where it is connected through a lever 246 pivoted to frame 1 at 248 and a pull rod 350 to a slide 352 laterally slidable on the lower side of the top of frame 1.

Figs. 1 and 28 illustrate the door operation. Normally, slide 352 is biased towards the right by a tension spring 354 so as normally to hold doors 32, 34 open and, through the linkage, to hold cam follower 332 against the profile of cam 328. However, when cam 328 turns to bring the high side of its profile against 332, the door operating linkage actuates slide 252 so as to move to the left as shown in Fig. 28 and doors 32, 34 close. As detailed in Figs. 1 and 28, doors 32, 34 are rigidly fixed on pivots 356, 358 and the latter are rotatably mounted on frame 1. Pivots 356, 358 are connected by oppositely extending crank arms 360 and 363 to slide 352 by pivot pins 364, 366 respectively. When slide 352 moves to the left in response to rotation of cam 328, crank arms 360, 363 are rocked counter-clockwise and clockwise respectively so that both doors 32, 34 swing up.

"Rest" phase

At the end of the "squeeze" phase of operation, diagrammatically illustrated in Figs. 4 and 17, the mechanism attains a "rest" condition illustrated in Figs. 18 and 23, immediately prior to which roller 252 on cam 256 has engaged the left-hand member of frame 250, moved rack bar 222 to the left and returned pinion 218 and valve rotors 188, 204 to their initial positions whence they started. In attaining the "rest" condition, juice trap 140 has swung down to an intermediate position, thereby stopping the flow to and through spout 138 while cam nose 301 has engaged the lower side of frame 298 to bring fork 282 to its intermediate position and thereby open switch 276.

"Wash" phase

The final "wash" phase of operation, illustrated in Figs. 19 and 24, is instituted by lifting the glass off holder 294. The lip of the glass engages bracket 296 and switch actuating lever 284 is thereby rocked clockwise so that roller 280 on forked end 282 moves downwardly to close switch 278, thereby re-starting electric drive motor 272 and the pulp disposal unit motor. Switch actuating lever 284 is held in its clockwise rocked position by engagement of spring finger 292 in the uppermost of notches 290 on forked end 288 as detailed in Fig. 21 while the remainder of mechanical control linkage operates as follows:

Cam 256 rotates clockwise so that its roller 252 engages the left-hand side of frame 250, thereby driving rack bar 222 to the left while rack teeth 220 rotate pinion 318 clockwise so as to bring valve rotors 188, 204 to the wash position illustrated in Fig. 19. The leftward travel of rack bar 222 brings about a consequent travel to the right of rod 302 through the action of arm 204 and lever 306, thereby retracting trap 140 completely into trap pocket 144 so as to permit wash-water from washing manifold 28, together with pulp and juice washed from jaws 14 and 36, to fall directly into pulp disposal unit 142. Meanwhile, wash-water is directed through juice trap wash pipe 246 to flush off juice trap 140 and the adjacent trap chamber. As illustrated in Fig. 23, the counter-clockwise rocking of trap actuating lever 162, which retracts juice trap 140 into pocket 144, also holds link 180 to the right so that the left-hand end of slot 178 engages pin 176, thereby sliding drip catcher 164 to the right until the edge of its drip receiving end 170 snaps beneath catch 172.

Finally, cam shaft 258 continues its clockwise rotation until cam 300 rotates to bring its nose 301 against the upper side of frame 298, thereby neutralizing roller 280 on fork 282 and opening switch 278 and the energizing circuits for electric drive motor 272 and the pulp disposal unit motor. It will be noted that the final rotative motion of cam shaft 258 has also brought cam 325 to its starting position in which roller 332 on lever 334 drops off ledge 330, thereby allowing spring 254 to pull doors 32, 34 open. During the "wash" phase, piston 62 has moved to the right, as seen in the drawings, thereby retracting movable jaw 36 away from fixed jaw 14 until valve 110 has been pulled open by chain 114 in the back travel control mechanism. Just before the circuit for electric drive motor 272 has been opened, and during the final rotative movement of cam shaft 258, roller 252 engages the right-hand side of frame 250 and moves rack bar 222 slightly to the right enough to rotate pinion 218 slightly counter-clockwise from the position it occupied during the "wash" phase of the cycle. This final movement returns valve rotors 188, 204 to their closing position illustrated in the "off" diagram of Fig. 16. The entire mechanism is thus conditioned to start the cycle anew.

The invention is not limited solely to the structure detailed above, but is intended to cover all modifications, substitutions and equivalents within the scope and spirit of the following claims.

I claim:
1. A hydraulic piston-operated jaw crusher including a crushing chamber, crusher-jaws in said chamber, a cylinder, a piston in said chamber connected to one of said jaws for closing and opening the same, first and second fluid input and exhaust connections for supplying water under pressure to said cylinder on either side of said piston whereby selectively to drive the same in jaw closing and opening directions while exhausting water from said cylinder on the other side of said piston, a wash-water supply conduit for said chamber, a first fluid control valve operable between a plurality of positions for selectively directing water under pressure to either of said fluid connections while establishing a fluid circuit from the exhausting fluid connection to an outflow system, a fluid connection between said wash-water supply conduit and said outflow system, a second fluid control valve in said wash-water supply conduit, operating concomitantly with the first fluid control valve whereby when said piston is driven in one direction to feed water exhausted from one side of said cylinder through said wash-water supply conduit to flush out said chamber, and means for operating said control valves.

2. A hydraulic piston-operated jaw crusher including a chamber, crusher-jaws in said chamber, a cylinder, a piston in said chamber connected to one of said jaws for closing and opening the same, fluid input and exhaust connections for supplying water under pressure to said cylinder on either side of said piston whereby selectively to drive the same in jaw closing and opening directions while exhausting water from said cylinder on the other side of said piston, a wash-water supply conduit for said chamber, fluid control valve means connecting one of said fluid input and exhaust connections and said wash-water supply conduit, and means for operating said fluid control valve means whereby when said piston is driven in one direction, to feed water exhausted from one side of said cylinder through said wash-water supply conduit to flush out said chamber.

3. A hydraulic piston-operated jaw crusher including a crushing chamber, crusher-jaws in said crushing chamber, a cylinder, a piston in said chamber connected to one of said jaws for closing and opening the same, first fluid conduit means connected to one end of said cylinder for supplying water under pressure thereto on one side of said piston whereby to drive the same in jaw closing direction and for exhausting water from said one end of said cylinder when said piston moves in jaw-opening direction, a wash-water supply conduit for said chamber, fluid control valve means connecting said first fluid conduit means and said wash-water supply conduit whereby when said piston is driven in jaw-opening direction to feed water exhausted from said one end of said cylinder through said wash-water supply conduit to flush out said chamber, second fluid conduit means connected to the other end of said cylinder for supplying water under pressure thereto on the other side of said piston whereby to drive the same in jaw-opening direction and for exhausting water from said other end of said cylinder when said piston moves in jaw-closing direction, a glass-holding chamber, means for conveying expressed fluids from said crushing chamber to said glass-holding chamber, and a second wash-water supply conduit for said glass-holding chamber, said fluid control valve means connecting said second fluid conduit means and said second wash-water conduit means when said piston moves in jaw-closing direction, and means for operating said fluid control valve means.

4. A hydraulic piston-operated jaw crusher including a chamber, crusher-jaws in said chamber, a cylinder, a piston in said chamber connected to one of said jaws for closing and opening the same, fluid conduit means connected to said cylinder for supplying water under pressure to one end thereof for driving said piston in jaw closing direction and for exhausting water from said one end of said cylinder when said piston moves in jaw-opening direction, means for driving said piston in jaw-opening direction, a wash-water supply conduit for said chamber, a fluid connection between said wash-water supply conduit and said fluid conduit means, said fluid connection including fluid control valve means, and means for operating said fluid control valve means whereby when said piston is driven in jaw-opening direction, to feed water exhausted from said end of said cylinder through said wash-water supply conduit to flush out said chamber.

5. A hydraulic piston-operated jaw crusher including a crushing chamber, trap means disposed below and in communication with said crushing chamber for selectively directing the outflow of matter from said crushing chamber to either of two outlets, crusher-jaws in said chamber, a cylinder, a piston in said chamber connected to one of said jaws for closing and opening the same, fluid input and exhaust connections for supplying water under pressure to said cylinder on either side of said piston whereby selectively to drive the same in jaw closing and opening directions while exhausting water from said cylinder on the other side of said piston, a wash-water supply conduit for said trap means, fluid control valve means connecting one of said fluid input and exhaust connections and said wash-water supply conduit whereby when said piston is driven in one direction to feed water exhausted from one side of said cylinder through said wash-water supply conduit to flush out said trap means, and means for concomitantly operating said trap means and said fluid control valve means.

6. In a jaw crusher, a crushing chamber having an access aperture in the upper portion thereof, a pair of jaws having substantially vertically disposed working faces in said chamber below said aperture, power means for closing and opening one of said jaws with respect to the other, a washing manifold in said chamber above said jaws, fluid supply means for supplying wash-water to said manifold, a door supported on said chamber above said manifold operable for opening and closing said aperture, linkage for operating said door, and common control means for said power means, said fluid supply means and said linkage whereby serially to move said linkage to close said door, close said one jaw towards the other, open said one jaw away from the other, and activate said fluid supply means.

7. In a juice extracting machine, a support, a juice extracting chamber carried by said support, means in said chamber for extracting juice from the pulp of fruit, said chamber having an outlet in the lower portion thereof, a distribution and delivery section mechanism carried by said support below said extracting chamber, said mechanism having an inlet in the upper portion thereof, a first outlet disposed directly below said inlet, a second outlet comprising a spout leading laterally from said upper portion, a trap moveably disposed in said upper portion and having a first operative position in which said trap extends across said inlet in blocking relationship with juices flowing therethrough and directs the juice laterally to said spout, said trap having a second operative position in which the same is withdrawn to a retracted position in which said upper portion of the mechanism is unblocked whereby pulp falls freely to said first outlet, a drip catcher moveably disposed across said spout, said drip catcher having a first operative position in which the same is withdrawn to a retracted position in which the spout is unblocked thereby and having a second operative position in which the same is blockingly disposed with respect to juices flowing through said spout, mechanical linkage for co-jointly moving said trap and drip catcher from either of their operative positions to their others, and synchronized means for driving said linkage.

8. A hydraulic piston-drive jaw crusher machine for extracting juice from the pulp of fruit, vegetables and the like products comprising, a juice extracting chamber having an access aperture in the upper portion thereof and an outlet in the lower portion thereof, a fixed jaw having a vertically disposed working face mounted transversely in one side of said chamber, a moveable jaw having a working face opposed to the fixed jaw, a piston having a piston rod supporting said moveable jaw, a cylinder slidably supporting said piston, first and second fluid connections on respectively opposite ends of said cylinder, fluid circuit and fluid control valve means for selectively directing water under pressure to the fluid connections, linkage for operating said control valve means, a door moveably mounted in said access aperture, linkage for opening and closing said door, a trap chamber disposed below the outlet for said extracting chamber, a delivery spout leading laterally from said trap chamber, a trap moveably mounted in said trap chamber and, moveable therein between trap unblocking and trap blocking positions, in the latter of which positions said trap directs juices flowing into said trap chamber laterally to said delivery spout, linkage for so moving said trap, a drip catcher moveably disposed beneath said delivery spout and moveable with respect thereto between spout blocking and spout unblocking positions, linkage for so moving said drip catcher, and common drive means for all of said linkages.

9. A hydraulic piston-drive jaw crusher machine for extracting juice from the pulp of fruit, vegetables and the like products comprising, a juice extracting chamber having an access aperture in the upper portion thereof and an outlet in the lower portion thereof, a first wash water supply conduit for said chamber, a fixed jaw having a vertically disposed working face mounted transversely in one side of said chamber, a movable jaw having a working face opposed to the fixed jaw, a piston having a piston rod supporting said movable jaw, a cylinder slidably supporting said piston, first fluid conduit means connected to one end of said cylinder for supplying water under pressure thereto on one side of said piston whereby to drive the same in jaw closing direction and for exhausting water from said one end of said cylinder when said piston moves in jaw-opening direction, second fluid conduit means connected to the opposite end of said cylinder for supplying water under pressure thereto whereby to drive the same in jaw-opening direction and for exhausting water from said opposite end of said cylinder when said piston moves in jaw-closing direction, a door movably mounted in said access aperture, linkage for opening and closing said door, a trap chamber disposed below the outlet for said extracting chamber, a glass-holding chamber disposed below and laterally of said trap chamber, a delivery spout leading laterally from said trap chamber to said glass-holding chamber, a trap movably mounted in said trap chamber and movable therein between trap unblocking and trap blocking positions, in the latter of which positions said trap directs juices flowing into said trap chamber laterally to said delivery spout, linkage for so moving said trap, a drip catcher movably disposed beneath said delivery spout and movable with respect thereto between spout blocking and spout unblocking positions, linkage for so moving said drip catcher, a second wash water conduit for said trap chamber, a third wash water conduit for said glass-holding chamber, fluid control valve means connecting said fluid conduit means and said wash water conduits, and common drive means for all said linkages and said control valve means whereby when said piston is driven in jaw-opening direction water exhausted from said one end of said cylinder is fed through said first and second wash water conduits to flush out said juice extracting chamber and said trap chamber and whereby, when said piston is driven in jaw-closing direction water exhausted from said opposite side of said cylinder is fed to said third wash water conduit to flush out said glass-holding chamber.

References Cited in the file of this patent

UNITED STATES PATENTS

| Number | Name | Date |
|---|---|---|
| 160,697 | Newberger | Mar. 9, 1875 |
| 783,428 | Golden | Feb. 28, 1905 |
| 808,861 | Mosteller | Jan. 2, 1906 |
| 859,505 | Moorman | July 9, 1907 |
| 1,007,907 | Yaeger | Nov. 7, 1911 |
| 1,077,437 | Smith | Nov. 4, 1913 |
| 1,191,760 | Canfield | July 18, 1916 |
| 1,292,014 | Munger | Jan. 21, 1919 |
| 1,474,801 | Street | Nov. 20, 1923 |
| 1,850,001 | D'Annunzio | Mar. 15, 1932 |
| 1,939,556 | Kammer | Dec. 12, 1933 |
| 2,142,975 | Majewski | Jan. 3, 1939 |
| 2,265,408 | Verbrugge | Dec. 9, 1941 |
| 2,454,256 | Myers | Nov. 16, 1948 |
| 2,522,800 | Quiroz | Sept. 19, 1950 |
| 2,528,533 | McCulloch | Nov. 7, 1950 |
| 2,535,553 | Stoner | Dec. 26, 1950 |
| 2,551,153 | Mladinich | May 1, 1951 |
| 2,560,096 | Elterman | July 10, 1951 |